Patented Oct. 7, 1952

2,613,129

UNITED STATES PATENT OFFICE 2,613,129

MIXTURE OF PHTHALOCYANINE VAT DYES AND PROCESS OF MAKING THE SAME

William B. McCormack and Frederic B. Stilmar, Wilmington, Del., assignors to E. I. du Pont de Nemours & Company, Wilmington, Del., a corporation of Delaware No Drawing. Application March 27, 1951, Serial No. 217,888

4 Claims. (Cl. 8—28)

This invention relates to the phthalocyanine coloring matters adapted for use as vat dyes. More particularly, this invention deals with cobalt phthalocyanines which have been modified by partial phosphonylation to adapt them for application to textile fiber by vatting.

That certain of the phthalocyanine compounds have the property of being vatted has been known since their earliest appearance in the literature (Brit. Pat. No. 322,169 of 1929). Nevertheless, they have not found much use as vat dyes up to now, principally because of the dull shades produced and lack of light-fastness. In recent years it has become known through the work of Bienert (P. B. 70339, frame 11206, 1948) that cobalt phthalocyanine, when vatted with sodium hydroxide and sodium hydrosulfite, will dye cotton (upon subsequent oxidation) to a clear, greenish blue shade. This suggestion nevertheless was still insufficient to produce a practical phthalocyanine vat dye, in view of the very poor solubility of cobalt phthalocyanine in the vat, producing as a result very weak dyeings.

Now we have found that the solubility of cobalt phthalocyanine in the vat, and consequently the strength of dyeing obtained therewith, can be immensely improved if part of the color is treated to introduce into the molecule the phosphonous acid group, —P(OH)$_2$. This treatment may be achieved in two steps.

In the first step, cobalt phthalocyanine is treated with phosphorus trichloride in an aluminum-chloride-sodium-chloride melt, at a temperature between 75° and 150° C., to produce an intermediate compound containing —PCl$_2$ groups. Then this product is hydrolyzed to replace the Cl atoms on the phosphorus by OH groups.

The quantity of P(OH)$_2$ groups entered per mole of the dyestuff is controlled to some extent by regulating the quantity of PCl$_3$, its concentration in the melt, and the temperature of the reaction. For the purpose of this invention, only a part of the color need be phosphonylated. Accordingly, the final product will have the general formula

[CoPc][P(OH)$_2$]$_x$ wherein CoPc stands for the cobalt-phthalocyanine molecule, while $x$ is a number less than 1.

For best results, we find that $x$ should have a value between 0.2 and 0.4. This can be achieved in two ways. For instance, if $x=0.3$ is desired, the color may be treated as above under regulated conditions to phosphonylate on the average 3 molecules in 10. Or the phosphonylation may be carried to a higher degree, and the resulting color then mixed with a calculated quantity of untreated cobalt phthalocyanine to give $x$ the desired value of 0.3.

It has been our observation that whereas cobalt phthalocyanine forms a very sparingly soluble green vat with caustic and hydrosulfite and therefore scarcely dyes cotton by the usual procedures, the above formulated product, wherein $x$ has a value between 0.2 and 0.4 gives a more soluble olive-green vat from which cotton is dyed in strong bright blue shades that are very fast to light. The theory is not well understood, but it is obvious that the cobalt phthalocyanine phosphonous acid helps the unreacted cobalt phthalocyanine to dye.

Without limiting our invention, the following examples will serve to illustrate the same. Parts mentioned are by weight.

Example 1

150 parts of sodium chloride and 600 parts of aluminum chloride are heated together to form a melt. At 120° C., 45 parts of cobalt phthalocyanine are added, and then, while keeping the mass at reflux temperature, 36 parts of phosphorus trichloride are introduced over a period of ½ hour. The melt is held at 120°–130° C. for one-half hour, there being some refluxing on PCl$_3$ at the end. It is then drowned in ice-water and HCl. The blue dye is filtered off and washed with water until acid-free to Congo red. The press cake may be standardized to a 10% paste and marketed or used in that form. It dyes cotton, from an olive-green vat, in strong blue shades.

The dried product analyzes 1.35% P by weight, which corresponds to an average $x$-value of about 0.3 in the above formula.

Example 2

400 parts of aluminum chloride and 100 parts of sodium chloride are heated until a melt is produced and then 20 parts of cobalt phthalocyanine are added at 100°–110° C. There are gradually added 39 parts of phosphorus trichloride, whereupon the reaction refluxes vigorously. The temperature is gradually raised to 140° C. and held for one-half hour. The melt is then drowned in ice water and hydrochloric acid. The blue dye is filtered off and washed with water until acid-free to Congo red. It dyes cotton, from an olive-green vat, in blue shades which are about 60% as strong as dyeings from the product of Example 1.

The dried product analyzes 3.3% P, which corresponds to an average of about 0.6 P(OH)₂ groups per molecule.

Example 3

2 parts of cobalt phthalocyanine, and 2 parts of the product of Example 2 are dissolved in 40 parts by volume of concentrated sulfuric acid. The solution is drowned in water and the product is filtered off and washed acid-free. It dyes cotton, from an olive-green vat, in strong bright blue shades stronger than the dyeings obtained in Example 2.

The procedure of Example 3 may be repeated, with good dyeing results, using different proportions of the two colors, so as to give the final composition an average $x$-value of between 0.2 and 0.4.

It seems from the above examples and discussion that we deal here with some sort of synergistic effect, wherein the phosphonylated fraction of the color apparently exerts a solubilizing effect on the non-phosphonylated fraction of the color in the vat.

The vatting in the above examples may be achieved in the same manner as vatting for dyes of the anthraquinone series. Sodium hydrosulfite in the presence of alkali is the preferred reducing agent, while oxidation may be achieved by exposing the dyed fiber to the air or by dipping it in an oxidizing bath, for instance a solution of sodium perborate or aqueous acetic acid solutions of sodium dichromate.

Further details on the vatting and oxidation procedure for illustrative purposes, but without limiting the invention thereto, are given in the following example:

Example 4

400 parts of water,
2 parts of 10% paste of the product of Example 1,
10 parts of 25% sodium hydroxide solution, and
2 parts of sodium hydrosulfite are heated to 60° C. to form an olive-green vat. Cotton skeins (20 parts by weight) are then stirred in the above solution for 45 minutes. After rinsing and air oxidation, a dyeing of a full and bright blue shade is obtained.

It will be clear by now that our invention provides new products which are useful in dyeing textile fibers by the vat method, in a degree of brightness not obtained by the standard vat dyes now available. In medium shades the new blue vat dyes are comparable in light-fastness with the indanthrone blues, and will withstand for instance 40 to 80 hours fadeometer exposure. The cost of the new products compares favorably with the cost of the standard anthraquinone vat blues. In bleach-fastness the new dyes are not so good as the anthraquinone vat dyes. The new products appear especially advantageous for admixture with vat greenish yellows to give greens of unexpectedly high light-fastness (much better than present green mixtures).

We claim as our invention:

1. A coloring composition of matter comprising a mixture of cobalt phthalocyanine and phosphonylated cobalt phthalocyanine, the average composition of the mixture corresponding to the formula

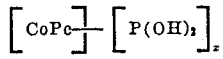

wherein CoPc represents the molecule of cobalt phthalocyanine, while $x$ has a value between 0.2 and 0.4.

2. A coloring composition as in claim 1, the mixture having on the average 3 P(OH)₂ radicals for each 10 molecules of the color.

3. The process of converting cobalt phthalocyanine into a vat dye of improved solubility in the vat, which comprises treating the same with phosphorus trichloride in an aluminum-chloride-sodium-chloride melt at a temperature between 75° and 150° C. whereby to introduce on the average from 2 to 4 PCl₂ groups into each 10 molecules of the initial color, and then hydrolyzing the product by means of aqueous acid to convert the PCl₂ groups into P(OH)₂ groups.

4. A process as in claim 3, wherein the reaction is conducted under concentration and temperature conditions introducing more than 4 PCl₂ groups for each 10 molecules, but wherein the hydrolyzed product is then admixed with unphosphonylated cobalt phthalocyanine by joint dissolution in concentrated sulfuric acid followed by drowning the dissolved mass in water.

WILLIAM B. McCORMACK.
FREDERIC B. STILMAR.

No references cited.